No. 816,394. PATENTED MAR. 27, 1906.
C. C. SPHUNG.
ANIMAL TRAP.
APPLICATION FILED NOV. 20, 1905.
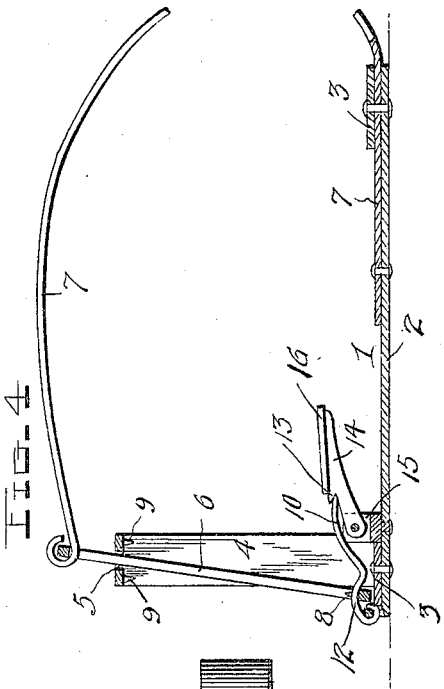
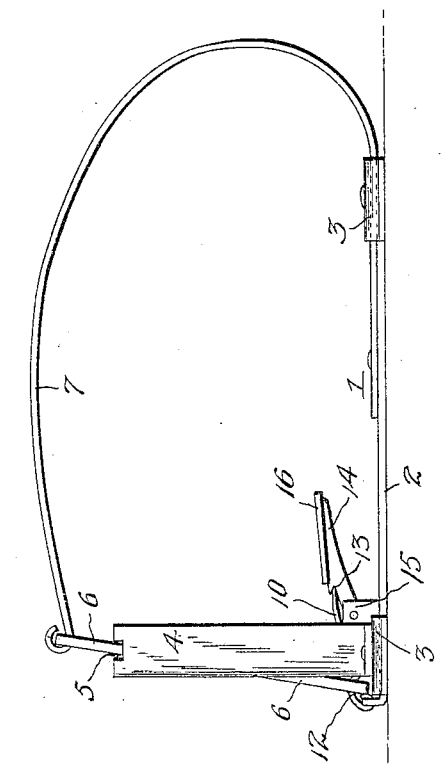
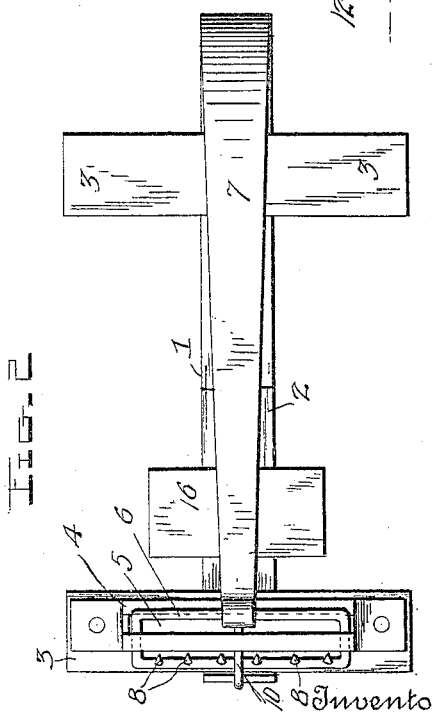
Witnesses
J. A. Griesbauer, Jr.
C. H. Griesbauer.
Inventor
C. C. Sphung
by H. B. Willson
Attorney

UNITED STATES PATENT OFFICE.

CHARLES C. SPHUNG, OF HUNTSPUR, MICHIGAN.

ANIMAL-TRAP.

No. 816,394.        Specification of Letters Patent.        Patented March 27, 1906.

Application filed November 20, 1905. Serial No. 288,264.

*To all whom it may concern:*

Be it known that I, CHARLES C. SPHUNG, a citizen of the United States, residing at Huntspur, in the county of Mackinac and State of Michigan, have invented certain new and useful Improvements in Animal-Traps; and I do declare the following to be a full, clear, and exact description of the invention, such as will enable others skilled in the art to which it appertains to make and use the same.

This invention relates to improvements in animal-traps.

The object of the invention is to provide a trap of this character which will securely hold an animal when caught thereby and which will not become inoperative from freezing and which will possess many advantages over the common form of steel traps.

With the above and other objects in view the invention consists of certain novel features of construction, combination, and arrangement of parts, as will be hereinafter described and claimed.

In the accompanying drawings, Figure 1 is a side view of the trap. Fig. 2 is a top plan view, Fig. 3 is a front view, and Fig. 4 is a vertical longitudinal sectional view, of the same.

Referring more particularly to the drawings, 1 denotes the base of a trap, which is here shown as consisting of a longitudinally-disposed bar or plate 2, at the ends of which are secured cross-bars 3. To the front cross-bar 3 is secured an upwardly-projecting yoke-shaped fixed jaw member 4, to the upper cross-bar of which is formed a transversely-disposed slot 5.

Adapted to be inserted through the slot 5 is a movable jaw 6, said jaw preferably consisting of an open rectangular frame, to the upper cross-bar of which is secured the forward end of a stiff bowed spring 7, the lower end of which is secured to the base bar or plate 2, as shown. On the inner side of the lower cross-bar 6 are preferably formed teeth or prongs 8, which when the trap is sprung are adapted to coact with a double row of teeth or prongs 9, formed on the inner side of the upper slotted cross-bar of the fixed jaw 4.

In order to hold the movable jaw 6 down in a set position, a tongue or pawl 10 is provided, said pawl being hingedly connected to the forward upwardly-turned end of the base-bar 2, as shown, and is preferably provided with an upwardly-projecting loop or bend 12. This loop 12 is adapted to engage the lower cross-bar of the movable jaw 6 to hold the lower end of said jaw slightly in advance of the upper end of the same, whereby when the trap is sprung the head of the animal will be more securely caught. The free end of the tongue or pawl 10 is preferably flattened or beveled and is adapted to be engaged with a notch 13, formed in a trip bar or arm 14, which is pivotally mounted between a pair of upwardly-projecting ears or lugs 15, secured to the base-bar 2 adjacent to the inner edge of the front cross-bar 3. On the free end of the arm or lever 14 is secured a treadle or bait-pan 16, upon which a suitable bait may be placed and which when engaged by the nose or feet of the animal will release the tongue or pawl 10, thereby permitting the spring 7 to jerk the movable jaw 6 upwardly through the slot 5 in the fixed jaw, thereby catching the head or neck of the animal between the lower cross-bar of said movable jaw and the upper cross-bar of the fixed jaw, thus choking and securely holding the animal. The teeth or prongs on the cross-bars of said jaws will sink into the flesh of the animal, and thus aid in despatching the victim.

A trap of this character may be securely and easily set and is adapted to be placed in a brush, pen, or other suitable place in the same manner as is usually done when using the common form of steel trap. The animal when caught by my improved form of trap cannot possibly escape.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A trap of the character described comprising a base, a fixed yoke-shaped jaw having formed in its upper end a slot, a movable jaw consisting of an open frame adapted to be projected through the slot in said fixed jaw and to coact therewith, a spring connected to said movable jaw, a hinged tongue to hold said movable jaw down against the tension of said spring, and means whereby said tongue is released by the weight of the animal, substantially as described.

2. A trap of the character described comprising a base, a fixed yoke-shaped jaw, having formed in its upper end a slot, a double row of teeth formed on the inner side of the upper end of said fixed jaw, a movable jaw consisting of an open frame adapted to be projected through the slot in said fixed jaw, a row of teeth formed on the lower cross-bar of said movable jaw, to coact with the teeth of said fixed jaw, when the trap is sprung, a bowed spring connected to said base and to the upper end of the movable jaw, a hinged tongue to engage and hold said movable jaw in set position and a hinged trip-arm adapted to be moved by the weight of an animal to release said tongue and spring said trap, substantially as described.

In testimony whereof I have hereunto set my hand in presence of two subscribing witnesses.

CHARLES C. SPHUNG.

Witnesses:
 THOS. LARKE,
 PETER BOWERS.